Nov. 9, 1965 H. M. SUSKI 3,217,145

SYSTEM FOR MEASURING THE RANDOMNESS OF BINARY DIGITS

Filed Dec. 28, 1962 3 Sheets-Sheet 1

INVENTOR.
HENRY M. SUSKI
BY Eugene T. Malin, Agent
Richard Reed

SYSTEM FOR MEASURING THE RANDOMNESS OF BINARY DIGITS

Filed Dec. 28, 1962 3 Sheets-Sheet 2

INVENTOR.
HENRY M. SUSKI
BY Eugene F. Malin, Agent
Richard C. Reed

Nov. 9, 1965 H. M. SUSKI 3,217,145

SYSTEM FOR MEASURING THE RANDOMNESS OF BINARY DIGITS

Filed Dec. 28, 1962 3 Sheets-Sheet 3

INVENTOR.
HENRY M. SUSKI

BY *Eugene P. Malin*, Agent
*Richard C. Reed*

3,217,145
SYSTEM FOR MEASURING THE RANDOMNESS OF BINARY DIGITS

Henry M. Suski, 5426 Rosecroft Blvd., Oxon Hill, Md.

Filed Dec. 28, 1962, Ser. No. 248,164
5 Claims. (Cl. 235—92)
(Granted under Title 35, U.S. Code (1952), sec. 266)

The invention described herein may be manufactured and used by or for the Government of the United States of America for governmental purposes without the payment of any royalties thereon or therefor.

This measuring device provides a means of giving go, no-go indications dynamically (continually) that sequences of binary digits, as they are generated (serially or in parallel), have randomness properties.

Methods of measuring randomness in the past have been almost purely analytical and have been applied to static sets of digits (i.e., tables of random numbers). Analytic means have been used for predicting the period of repetition of generating functions which when programmed, supply random numbers to large scale computers. In only two known instances is the problem of randomness measurement considered from the dynamic point of view; these two instances are embodied in the following three devices: a randomness analyzer designated TSEC/ST–4 (T–1) and a randomness monitor with an associated alarm, designated respectively KIO–1 (T–1)/TSEC and KIO–2 (T–1)/TSEC. To a degree the two measuring devices and that of the device being described herein yield results indicative of the presence of randomness among the digits of binary sequences being tested. While the question of how well these devices compare with purely analytical means is not set forth herein, the underlying theory of measurement and the means for setting counter limits, the decision criteria, and some possible digital grouping arrangements are considered in detail in U.S. Naval Research Laboratory Report 5730.

It is accordingly an object of the present invention to continually check randomness of binary sequences.

Another object is to provide an indication when the device is operating normally. A positive indication is given when, either the counts are appropriately all within the required limits, or when some are out of limits.

A further object is to provide improved indications of operation (randomness) from certain known non-random sequences by selecting three digital groupings for counting on the basis of the expected erroneous response to certain non-random sequences—two of the groupings can be selected independently, but the third must be chosen specifically to avoid the non-random sequences common to the other two groups.

These and other objects, advantages and novel features of the invention will be apparent from the following description and the accompanying drawings.

Figure 1:
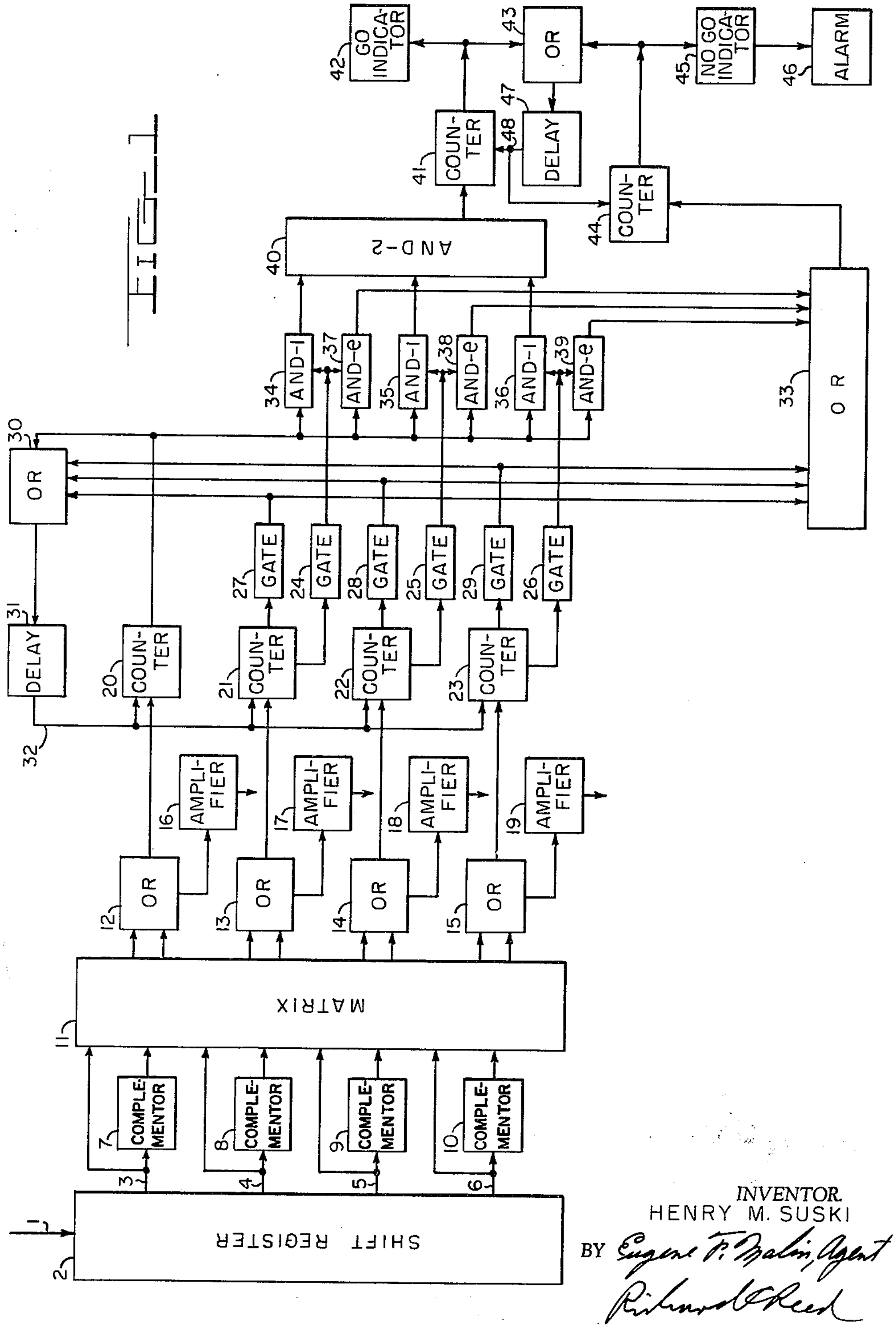
FIG. 1 is a block diagram of the system for measuring the randomness of binary digits in accordance with the invention.

There are two ways in which random or, more appropriately, pseudorandom numbers can be obtained. The numbers can be taken from a table, i.e., statically, or, they can be created continually (dynamically) and used as required. In the past, a number of (static) tabulations satisfied the needs. With the increased use of high-speed computers, the need for generating pseudorandom digits continually (dynamically) has also increased. Routines are available which can be used by specific computers to create pseudorandom digits as the machine requires them.

Regardless of how the digits are generated, the problem remains to determine if the digits produced are random. In the static case of a tabulated set of digits, the tabulation is subjected to a set of statistical tests. The fact that the table was published indicates that the conclusion drawn from the tests is that the entries are random with a high enough degree of confidence. In the dynamic case, where the random digits are produced continually, repeated testing is necessary if the process of generating digits is to be checked. In the case of a computer routine, the routine is selected because the digits produced will exhibit random properties.

Problems associated with measuring randomness in the dynamic case of a generator continually producing binary digits have been investigated. The mathematics of Bernoulli trials serves as the model against which the performance of the generator is compared. It was shown that there are a large number of ways in which a measuring system might be attempted. Such systems are based on explicit functions (called measure functions) of $p$, the probability that a "one" is generated.

Since the digits can be grouped (a group consists of $m$ digits), a binomial expansion $|p+(1-p)|^m$ can be written for each value of $m$. Any term or combination of terms of any expansion can serve as a measure group, the basis of a measure function.

A typical measuring problem involves the case where $p$ is constant and has a value within specified tolerances. A go/no-go measurement indicates that $p$ is within the specified tolerances. Means are provided (see NRL Report 5730) for the setting of measure group-count tolerances; a count alone then provides the indication of an acceptable or nonacceptable value of $p$. The sample size is selected on the basis of the desired confidence limit or the upper bound of the error in measuring $p$.

Since there are many possible measure functions, some means is required for comparing the relative effectiveness of different functions. A useful method of comparison is available if measure function "acceptance" characteristics are plotted. An acceptance characteristic is a plot of the probability that the measure group digits occur within the determined group-count tolerances. The acceptance characteristic is plotted for the results obtained from a single application of a particular measure function. By requiring a sequence of applications of the same measure function and by introducing an acceptance decision criterion, the acceptance characteristic more nearly approaches the ideal.

Under certain conditions, a failure of the generator might manifest itself by the appearance of a repeated sequence of digits. Upon investigation, necessary conditions for a go/no-go measuring system to breakdown, i.e., to give erroneous "accept" or "go" readings for an input consisting of specific repeated sequences, were evaluated. It was found that immunity from breakdown is dependent upon the number of digits in the group used in the measure function; the longer the group, the longer is the sequence of digits which can cause an erroneous indication—thus, more immunity.

Binary digits which are available from a table (statically) or which are generated (dynamically) one at a time (serially) can be tested in the following way to determine if a sample of such digits exhibits randomness properties. In either case, static or dynamic, the decision of random behavior is based on a comparison with the characteristics of the binomial distribution. The individual digits of a binary sequence can be grouped into $m$-digits. The sequence is a set of serially generated digits. Referring now to FIG. 1, if the digits generated serially are fed at 1 into a shift register 2 having $m$-stages, then $m$-digit number groups are formed. If $m$-digits can be fed into the device in parallel, the shift-register 2 can be by-passed. By using a complementor for each stage of the shift register so that a definite signal is available whether the digit at each stage is either a 0 or a 1, then distinct signals are available for combination in the matrix 11 to form each of the $2^m$ possible groups of digits. Theoretically, any group of $m$ digits can be expected to occur with probability $1/(2^m)$—and this is the basis for comparison. The shift register 2 is connected to the complementors 7 to 10 by means 3 to 6.

Use can be made of the two outputs from any stage of the shift register (e.g., the $i^{th}$) to count the number of groups and thereby establish the group sample size, $n$. Thus, $n$ can be counted in a counter which adds up to and including $n$—an output of the "$n$ counter" provides an output or "read" signal, as will be explained below. The value of $n$ to be used can be determined as indicated in U.S. Naval Research Laboratory Report 5730.

Either a complete or partial matrix (as required) can be used to form the groups of digits. To assure that the results of measurement will not be subject to erroneous "accept" or "go" indications some care must be exercised in selecting the particular digital groupings to be used. The erroneous indications of "accept" occur if repeated sequences (nonrandom) are fed in at the input. Certain groupings of digits used in the test might not be distinguished from a random sequence; e.g., the sequence of six repeated digits, 000111 . . .—this repeated sequence has $m_s=6$ digits repeated.

Figure 2:
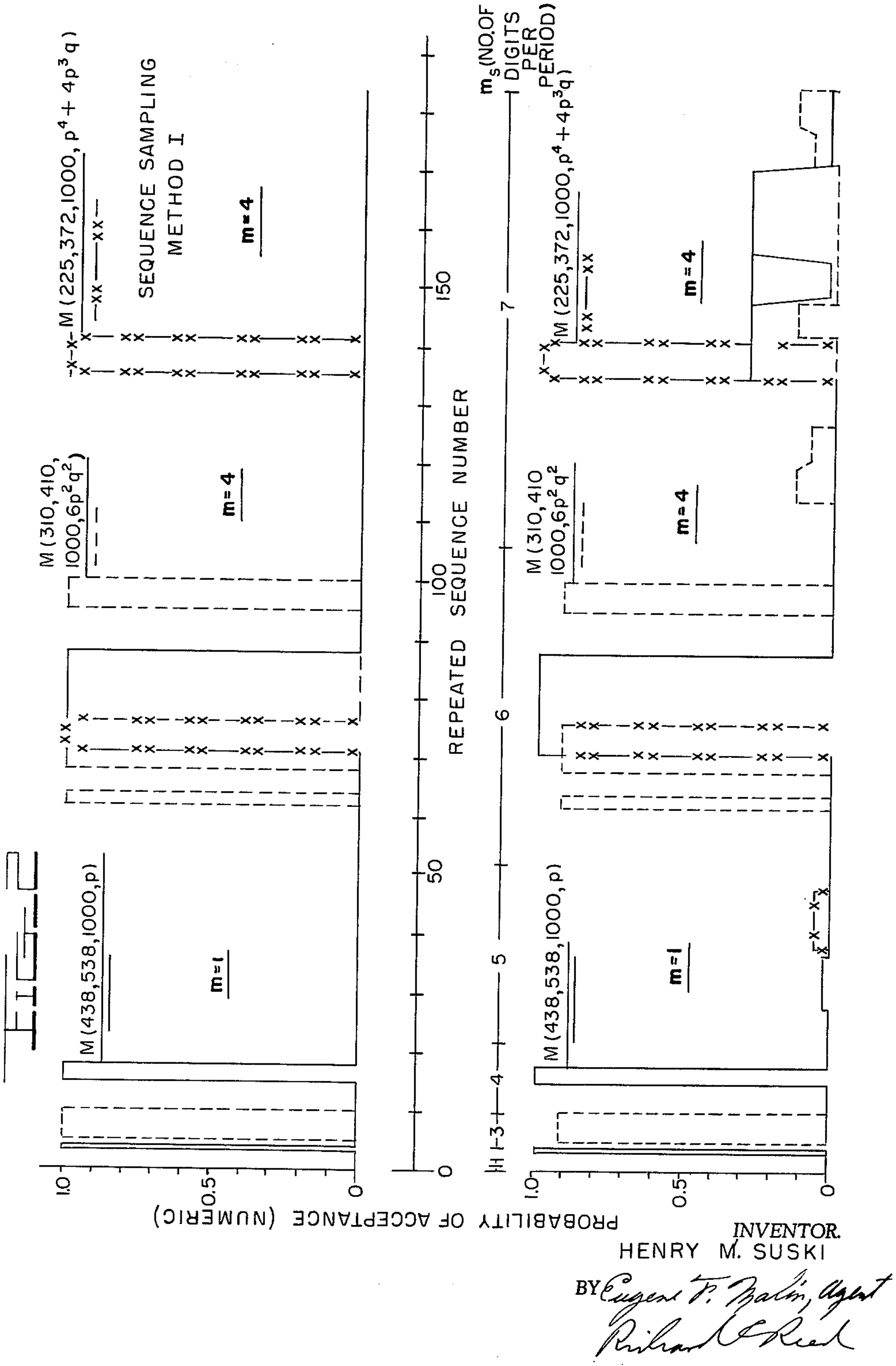
FIG. 2 is a plot of the probability of acceptance versus specific repeated sequences.

FIG. 2 is a plot of the probability of acceptance vs. specific repeated sequences (listed in increasing value of $m_s$). As can be seen three functions (groups of digits) for two values of $m$ are plotted, $m=1,4$. Each of the functions has regions in which erroneous "accept" indications can be obtained. Two of the functions have a number of scattered regions, while the third has only two relatively narrow regions. If one of the first two is combined with the third function then the region of mutual effect is only where the "accept" regions of both functions overlap. In FIG. 2 there are two means considered for introducing the generated sequences at the input (FIG. 1)—hence, there are two plots. Take the worst of the two plots—the lower one, with two overlapping regions. We can determine the groupings which are produced by sequences in the common regions. Hence, we seek a third function which avoids these digital groups. Then, upon combining all three functions we have eliminated the erroneous "accept" indications out to the maximum value of $m_s$ which has been used. This problem is discussed in more detail in U.S. Naval Research Laboratory Report 5730.

Referring again to FIG. 1, the three digital groups are formed in the matrix 11 by using three OR circuits, 13 to 15, one for each group. The OR (1) circuit output signals for each group are counted in counters 21, 22 and 23, respectively. These counters are similar and are arranged to provide a gate signal whenever the number of counts exceeds the allowable low limit to tolerance ($k>k_1$ where $k$ is the group count and $k_1$ is the low limit tolerance) shown at 24 to 26. Each counter is further set to provide a signal if the count $k$ (for a group) exceeds the high limit tolerance ($k_2$), or if $k>k_2$, shown at 27 to 29. The method of setting limits $k_1$ and $k_2$ is described and discussed in U.S. Naval Research Laboratory Report 5730. OR circuit 12 is connected to counter ($n$) 20. Amplifiers 16 to 19 are connected to a test counter.

If a count is correct $k_1 \leq k \leq k_2$ (for each of the three groups $k_1$ and $k_2$ may have different values). Then when the "read" signal occurs, as mentioned above, the signal from counter 20, and the $k_1$ gate (24, 25 or 26) cause an AND–1 circuit (34, 35 or 36) output for each correct count and if there are three correct simultaneous such signals, one from each group, there will be an output signal from the AND–2 circuit, shown at 40. The output from the AND–2 circuit will be counted in counter 41, whose maximum count is set for the particular decision criterion which may be selected (see NRL Report 5730 for a description of a possible decision criterion). Thus, to get a "go" indication at 42 requires that an appropriate number of correct readings be obtained.

The fact that a correct reading has been obtained ($k_1 \leq k \leq k_2$) is shown by an output from each AND–1, i.e., 34, 35 and 36, causing an output from AND–2. When this occurs the "read" signal resets, through 30, 31 and 32, counters 21, 22 and 23. The presence of the "read" signal and $k_1$ gates from each of the three counters (21, 22 and 23) causes inhibit signals which prevent an error signal from appearing at OR ($e$) circuit 33.

In the event that in any counter $k<k_1$, a $k_1$ gate signal will not be generated at the time that the "read" signal appears. In this case, the appropriate AND–$e$ circuit (37, 38 or 39) will give an output which is fed to counter ($ng$) shown at 44 and if the error count exceeds the maximum allowed by the decision criterion before a GO indication is obtained, then the NO GO indicator comes on at 45, and, if required, an alarm 46 will sound or will be triggered into action.

It has been indicated above that counters 21, 22 and 23 only count up to the respective upper limits. These counters are arranged so that if one, two or three of them exceeds the allowable upper limit, $k>k_2$, then a signal is generated which initiates a reset of the counters, through 30, 31 and 32, and is applied to OR ($e$) circuit 33, to be counted as an error (only the first high count which occurs causes the reset and, hence, only is counted as an error). This feature permits maximum use of the measuring system; or minimum time will be spent if high counts are obtained.

Note that counters ($g$), 41, and ($ng$), 44, are reset by each other through 43, 47 and 48; one will reach its decision count before the other.

A delay of an amount appropriate to the counting rate is introduced for resetting the counters;

$$D=\frac{1}{\text{maximum counter frequency}}$$

As indicated in the discussion above and more or less implicit in the FIG. 1, digital counting is indicated. It is not intended that analog means of counting could not be employed.

The counting requirements include: (1) the ability to count up to a number $k_2+1$, at which point a signal output from the counter is required; (2) to count up to a number $k_1$, at which point a gate signal must be generated. These are the requirements for counters 20, 21, 22, and 23.

In selecting the limits $k_1$ and $k_2$ (or $n$) for each of the counters an upper bound of error is associated with each individual measurement (see NRL Report 5730). Digital counting means may result in an error of 1 count; and are essentially independent of the number counted. If, however, the additional error introduced by analog methods is small then the error might be tolerated. Additionally, if the error can be measured, or otherwise determined, the error might be compensated for by a readjustment of the values for $k_1$ and $k_2$. In fact, the selection of the tolerances $k_1$ and $k_2$ might include a narrowing of the limits to account for some of the overall upper bound of error. If this has been done then care may have to be exercised in further narrowing of the tolerances. To the extent that the differences $k_2-k_1$ permit, analog counting methods might be employed.

It is expected that any additional measuring error caused by an analog counting method will be independent of the inherent measuring error represented by the previously mentioned upper bound of error. Furthermore, there is no reason to believe that the error will not be of a random nature. Hence, the combined effect can be determined as the statistical sum.

$$e=6\sqrt{\sigma_1^2+\sigma_2^2}$$

where $\sigma_1$ and $\sigma_2$ are the standard deviations of the two independent errors. If $\sigma_2=1/2\sigma_1$, then $$e=6\sigma_1\sqrt{1.25}=1.12\ (6\sigma_1)$$

Thus, if the additional error can be held to about half the upper bound of error, then the overall error is increased by about 12%. For example, if $6\sigma$=a 5% error, then $e$ is 5.6%. Such an increase in error may be tolerable in a practical case.

Since the system design was based on a knowledge of how particular groups of digits as selected in the matrix for counting respond to the presence of repeated digits, use can be made of this knowledge in making an overall, nearly complete, test of the entire system. It will be recalled that two groupings, having the same acceptance regions (FIG. 2) when repeated sequences are used, were chosen—hence the repeated sequences are known. A generator will produce such sequences. This takes care of two of the groups—the test sequence would be contained within the common region for two of the groups. Since this sequence is not common to the third group, the system should indicate "no go." Now, when the sequence for the third group is used, a "no-go" indication should also be obtained. By arranging to disconnect inputs (appropriate to the sequence being used) and the AND–2 circuit 40, and substituting "test" voltages, a "go" indication should be obtained in a relatively simple way with a minimum of changes to the overall system.

For purposes of calibration of the counters means are provided for using a test counter in parallel with each of the counters used. This will assure correct settings of the total counts ($n$, and each of the $k_2$ values) as well as the $k_1$ gate signal initiations (at the appropriate counts). In the event analog counters are used this calibration provides a check of the counting error. For this type of calibration procedure an amplifier at the output of each AND–1 circuit might be added as a means of isolating the test counters from the system proper.

Figure 3:
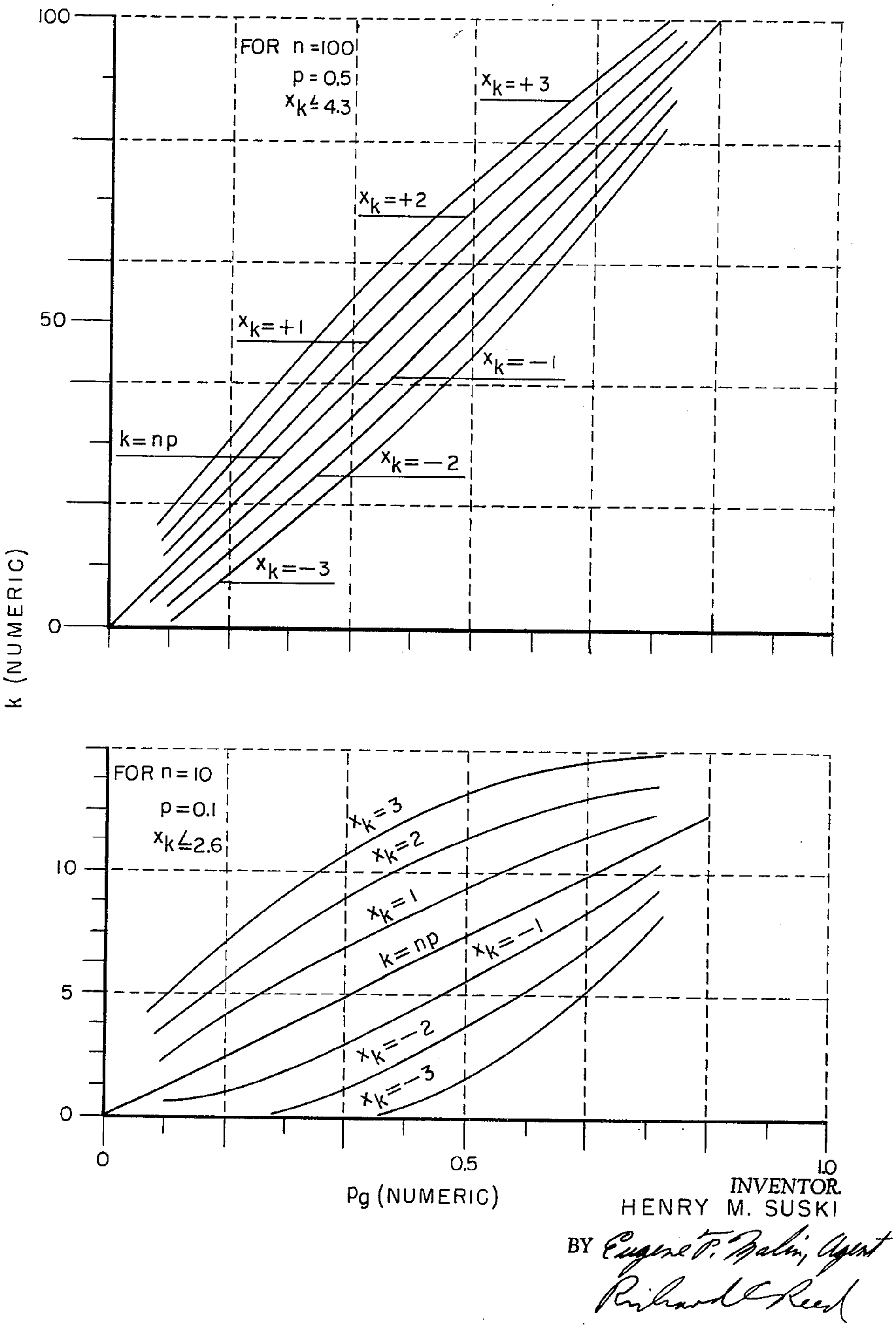
FIG. 3 is a graph showing group count $k$ as a function of $P_g$, the probability of occurrence of the particular group.

With test counters connected to amplifiers 16–19 a series of measurements can be made and the results recorded. If a statistically adequate number of measurements is taken, an average count $k$ can be calculated. By means of a graph similar to FIG. 3, the valve of $p_g$ (the probability of occurrence of the selected group of digits) can be found, corresponding to $k$. And from $p_g$ the corresponding value of $p$, the probability that a one occurs. The entire record of measurements can be used to test statistical consistency, giving further evidence of the random nature of the input to the measuring system.

Obviously many other modifications and variations of the present invention are possible within the scope of my invention. It is therefore to be understood that within the scope of the appended claims, the invention may be practiced otherwise than as specifically described.

What is claimed is:

1. A system for measuring the randomness of binary digits comprising:

means for receiving and grouping said binary digits, counting means having a plurality of counters connected to said means for receiving and grouping for producing a signal indicative of the number of digits, first gating means connected to each of said counters for producing a first signal when the number of counted digits is within a preselected range, second gating means connected to each of said counters for producing a second signal when the number of counted digits is not within said preselected range, a first counter means for counting the number of signals produced by said first gating means, whereby the output of said first counter is indicative of the number of correct counts, a second counter for counting the number of signals produced by said second gating means, whereby the output of said second counter is indicative of the number of incorrect counts, a go indicator connected to said first counter for producing an indication when the number of counts of said first counter exceeds a preselected maximum, and a no go indicator connected to said second counter for producing an indication when the number of counts of said second counter exceeds a preselected maximum.

2. The system set forth in claim 1 in which said means for receiving and grouping binary digits includes a matrix and a plurality of OR circuits.

3. The system of claim 2 in which said counting means includes a means for counting the total number of digits and for producing a read signal for gating the signals from the first and second gating means.

4. A system for measuring the randomness of binary digits in which an indication of the number of digits falling within a preselected range is obtained comprising:

a shift register for receiving serial binary digits and having a parallel output, a matrix, a plurality of complementors connected between said shift register and said matrix, a plurality of OR circuits connected to the outputs of said matrix, counting means connected to each of said OR circuits for producing a signal indicative of the number of counted digits, said counting means including means for counting the total number of digits and for producing a read signal for gating the signals from the first and second gating means, first gating means connected to each of said counters for producing a first signal when the number of counted digits is within a preselected range, second gating means connected to each of said counters for producing a second signal when the number of counted digits is not within said preselected range, a first counter means for counting the number of signals produced by said first gating means, whereby the output of said first counter is indicative of the number of correct counts, a second counter for counting the number of signals produced by said second gating means, whereby the output of said second counter is indicative of the number of incorrect counts, a go indicator connected to said first counter for producing an indication when the number of counts of said first counter exceeds a preselected maximum, and a no go indicator connected to said second counter for producing an indication when the number of counts of said second counter exceeds a preselected maximum.

5. The system set forth in claim 4 including an error reset means connected between said gating means and said counting means.

No references cited.

NEIL C. READ, *Primary Examiner.*